No. 869,117. PATENTED OCT. 22, 1907.
C. E. WADE.
MANUFACTURE OF ARTIFICIAL LUMBER.
APPLICATION FILED JAN. 13, 1906.
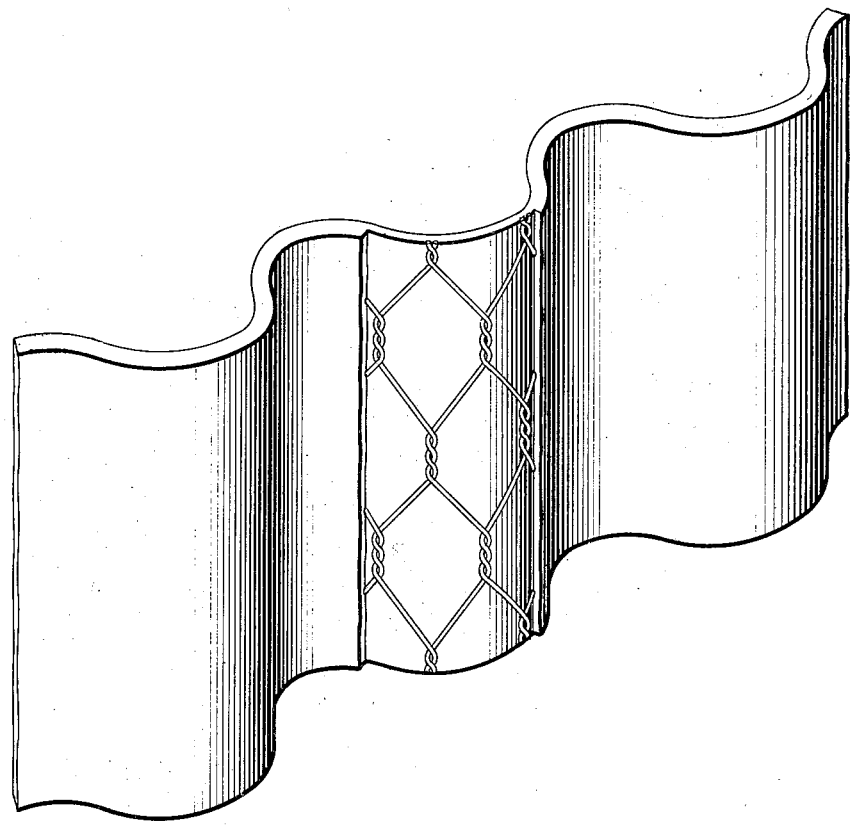
WITNESSES:
INVENTOR:
CHARLES E. WADE,

UNITED STATES PATENT OFFICE.

CHARLES E. WADE, OF GWYNEDD, PENNSYLVANIA, ASSIGNOR TO KEASBEY & MATTISON COMPANY, OF AMBLER, PENNSYLVANIA, A CORPORATION OF PENNSYLVANIA.

MANUFACTURE OF ARTIFICIAL LUMBER.

No. 869,117.     Specification of Letters Patent.     Patented Oct. 22, 1907.

Application filed January 13, 1906. Serial No. 295,858.

*To all whom it may concern:*

Be it known that I, CHARLES E. WADE, of Gwynedd, in the State of Pennsylvania, have invented certain new and useful Improvements in the Manufacture of Artificial Lumber, whereof the following is a specification, reference being had to the accompanying drawing.

My improvements relate to the production of artificial lumber formed by combining fibrous materials such as asbestos with hydraulic cement, and comprise the means whereby I am enabled to produce this material in the form of corrugated sheets, thereby increasing the strength of the product without increasing its weight.

I have discovered that in order to successfully produce a corrugated sheet of such asbestos lumber, it is essential that the lumber should be reinforced by the interposition between its successive layers of one or more layers of wire mesh, and I have also discovered that the corrugation of such a sheet of reinforced asbestos lumber can only be accomplished while the compound sheet is in its watery or pulpy condition; but that if properly corrugated while in this condition and then allowed to dry, the fibrous matter of the lumber so interlocks itself with the corrugated wire mesh as to result in a sheet having great strength and consistency and capable of resisting considerable strains not merely in the direction in which the corrugations run but also in other directions. This is due to the fact that the fibrous material of the lumber and the woven material of the wire mesh each reinforce the other against strains, so that although the corrugated sheet of the one or the other alone has little ability to withstand strains tending to flatten it out, yet when combined they afford a resistance to such strains far in excess of the sum of the resistance which each of them alone are able to oppose.

The accompanying drawing shows a perspective view of a piece of artificial lumber corrugated so as to embody my invention with certain portions broken away so as to show the structure.

In United States Letters Patent #769,078, dated August 30th, 1904, and granted to Ludwig Hatschek, there is described a process of making artificial lumber of the character to which my invention relates, that is to say, by combining fibrous material such as asbestos with hydraulic cement in a watery mixture and feeding the same into a machine analogous to a paper machine by which the successive layers of the resulting pulp are superimposed by winding upon a roller until the required thickness has been secured. The structure thus formed is then slit while in its pulpy condition and removed from the roller, flattened, subjected to pressure, and when dried, forms the exceedingly hard structural material now commonly known as artificial lumber.

In order to produce my present invention, I first combine with such lumber a wire mesh embedded in its structure. The wire mesh may be of any known form, but in the drawing I have shown the ordinary commercial wire mesh which I prefer to employ. In order to embed the mesh in the material, a piece of the same is cut to the proper size to surround the roller on which the lumber is formed without any overlapping of its edges. After a sufficient number of layers of the pulp have run on the roller, the wire is fed into place passing around the roller beneath the layer of pulp which is being applied. Thereafter, the rotation of the roller and the superimposition of further layers proceeds until the required thickness of the composite material has been secured. The resulting cylinder of pulpy asbestos lumber with the mesh embedded within it is then removed from the roller by slitting it along the line of the transverse edges of the mesh. It is then flattened and fed under the reciprocatory edge of a corrugating hammer which produces corrugations at regular intervals as the sheet is caused to progress beneath it. The soft corrugated sheet thus formed is then further compressed between dies having corrugations corresponding to those which have been imparted to the composite sheet. The material is then dried and is ready for use.

If additional strength or thickness is required, two or more layers of wire mesh may be embedded within the asbestos lumber either in immediate proximity to each other or at intervals during its formation.

Having thus described my invention, I claim:—

1. A corrugated sheet of asbestos fiber combined with hydraulic cement having wire mesh embedded within it.

2. A composite sheet of structural material formed by the successive superimposition of very thin continuous pulpy layers of asbestos fiber combined with hydraulic cement, having wire mesh embedded between certain of these layers, the whole being corrugated.

3. A corrugated structural material consisting of successively superimposed corrugated laminæ of asbestos fiber combined with hydraulic cement, and a corrugated wire mesh embedded therein.

4. The process of forming corrugated sheets of asbestos lumber which consists in embedding a layer of wire mesh between successive layers of a pulp consisting of asbestos fiber and hydraulic cement, as it is formed on the roller of a paper machine; removing the soft sheet thus formed from the roller; corrugating it while soft; and allowing it to set.

In testimony whereof, I have hereunto signed my name at Philadelphia, Pennsylvania, this—twelfth—day of January, 1906.

CHARLES E. WADE.

Witnesses:
JAMES H. BELL,
E. L. FULLERTON.